(12) United States Patent
Mori

(10) Patent No.: US 9,292,774 B2
(45) Date of Patent: Mar. 22, 2016

(54) IMAGE FORMING APPARATUS, IMAGE FORMING METHOD

(71) Applicant: CANON KABUSHIKI KAISHA, Tokyo (JP)

(72) Inventor: Junichi Mori, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/673,911

(22) Filed: Mar. 31, 2015

(65) Prior Publication Data

US 2015/0286911 A1 Oct. 8, 2015

(30) Foreign Application Priority Data

Apr. 2, 2014 (JP) ................................ 2014-076464

(51) Int. Cl.
*G06K 15/00* (2006.01)
*G06K 15/02* (2006.01)
*G06K 15/16* (2006.01)

(52) U.S. Cl.
CPC ............ *G06K 15/1886* (2013.01); *G06K 15/16* (2013.01); *G06K 15/4065* (2013.01); *G06K 2215/0088* (2013.01)

(58) Field of Classification Search
None
See application file for complete search history.

(56) References Cited

U.S. PATENT DOCUMENTS

| | | | | |
|---|---|---|---|---|
| 4,862,217 A | * | 8/1989 | Russel | G03G 15/01 399/184 |
| 6,891,637 B1 | * | 5/2005 | Asami | G06F 17/217 358/1.15 |
| 7,019,854 B1 | * | 3/2006 | Sawano | G06F 3/1204 358/1.15 |
| 2008/0100865 A1 | * | 5/2008 | Okano | G06F 21/608 358/1.15 |
| 2010/0195134 A1 | * | 8/2010 | Miyata | G06F 3/1203 358/1.14 |
| 2013/0185176 A1 | * | 7/2013 | Anchala | G06Q 30/02 705/27.1 |

FOREIGN PATENT DOCUMENTS

JP 2006178608 A 7/2006

* cited by examiner

*Primary Examiner* — Miya J Cato
(74) *Attorney, Agent, or Firm* — Rossi, Kimms & McDowell LLP

(57) ABSTRACT

An image forming apparatus comprises a printing unit that performs a double-sided print for a plurality of pages and a deletion unit that deletes data of a page that the printing unit prints. The deletion unit, in a case where a page printed last by the printing unit out of the plurality of pages is an odd page counting from the first page in a print order, does not delete but stores data of the page printed last.

8 Claims, 15 Drawing Sheets

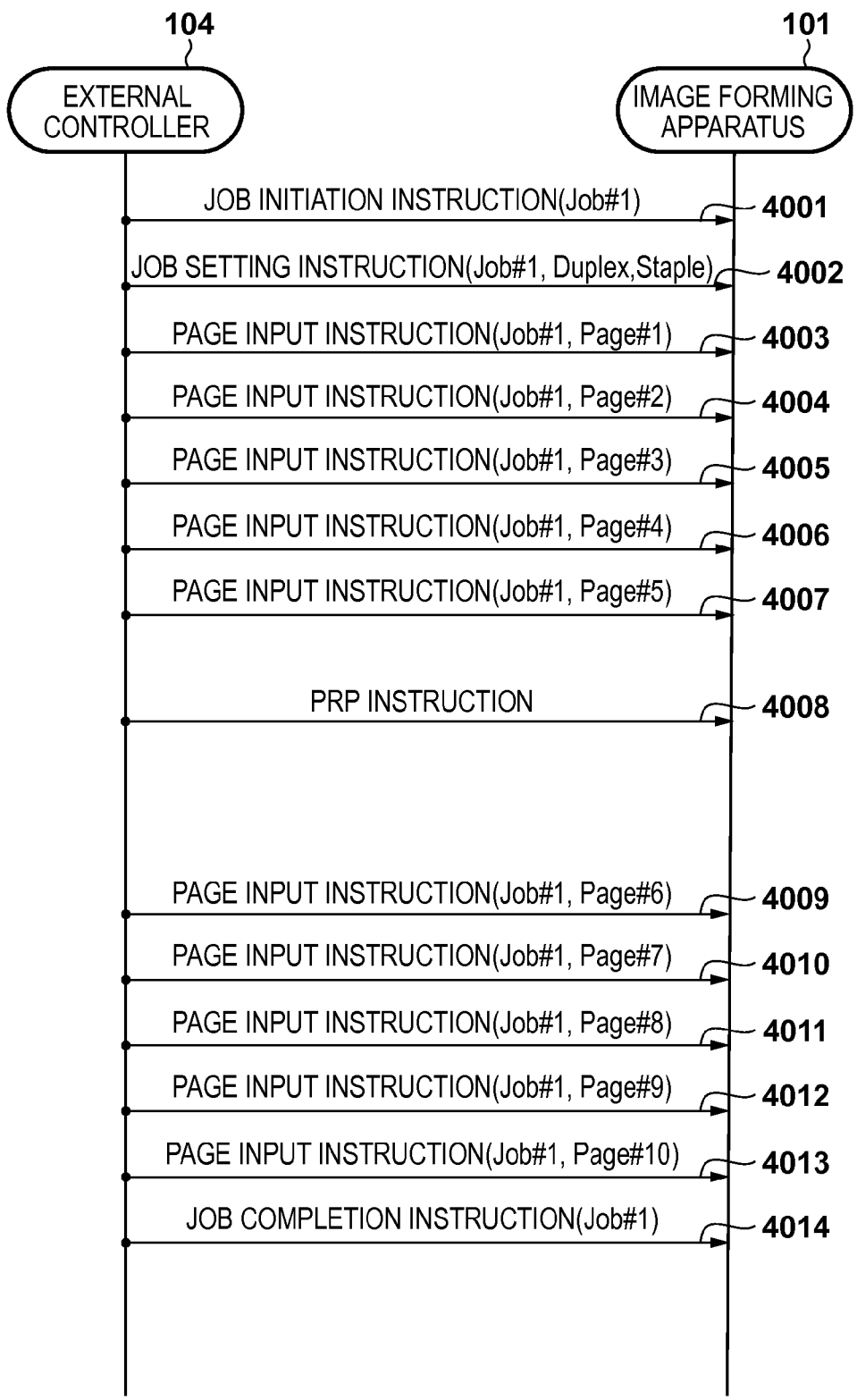

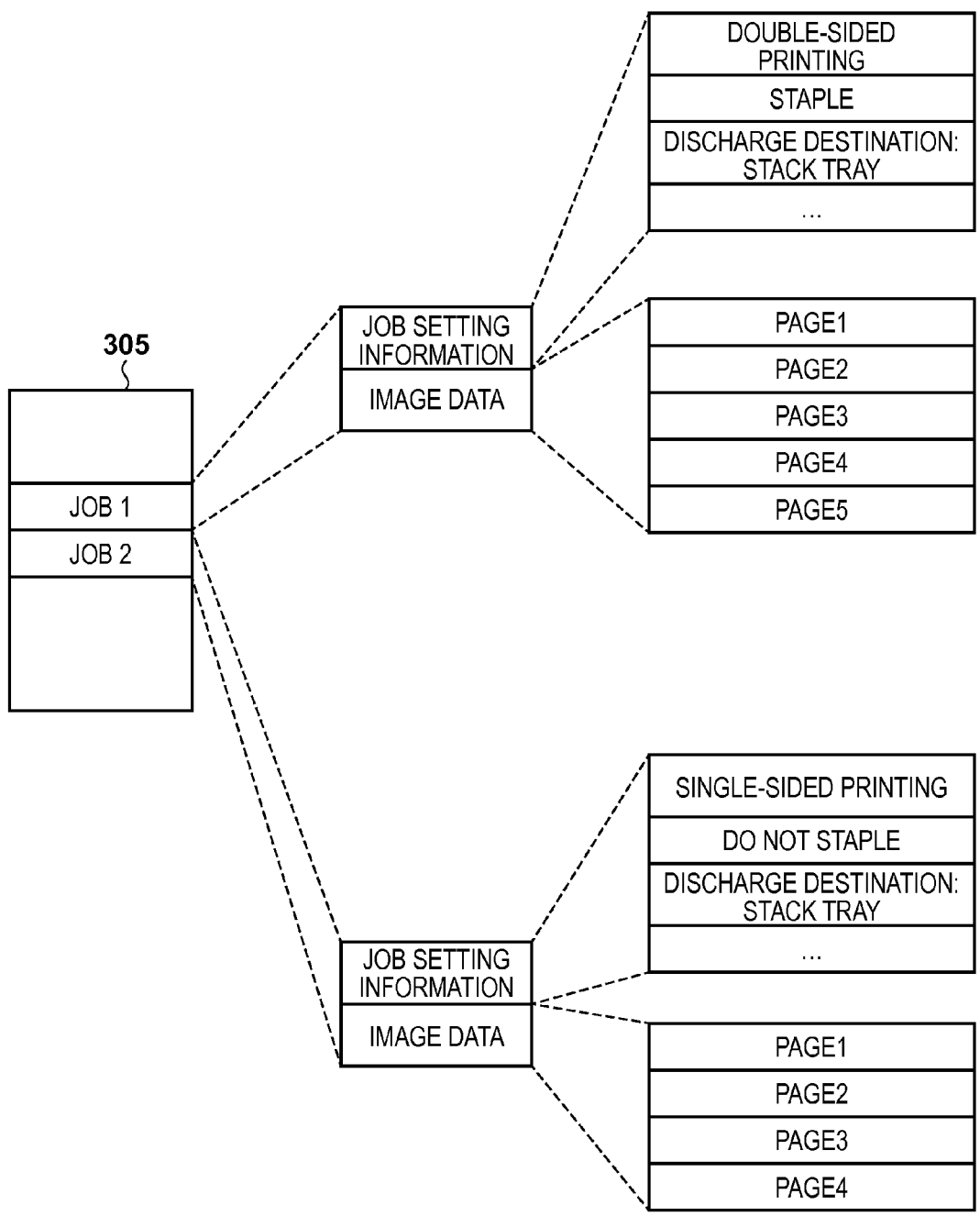
F I G. 11

FIG. 12
AFTER EXECUTING 4001-4007
| PAGE1 |
| PAGE2 |
| PAGE3 |
| PAGE4 |
| PAGE5 |
⬇
AFTER PRINTING IN S5110 ACCORDING TO 4008
| PAGE1 ✗ |
| PAGE2 ✗ |
| PAGE3 ✗ |
| PAGE4 ✗ |
| PAGE5 |
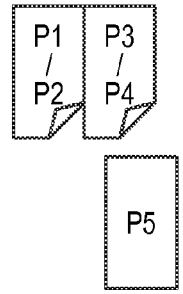
⬇
AFTER EXECUTING 4009-4013
| PAGE5 |
| PAGE6 |
| PAGE7 |
| PAGE8 |
| PAGE9 |
| PAGE10 |
⬇
AFTER PRINTING IN S5108 ACCORDING TO 4013
| PAGE5 ✗ |
| PAGE6 ✗ |
| PAGE7 ✗ |
| PAGE8 ✗ |
| PAGE9 ✗ |
| PAGE10 ✗ |
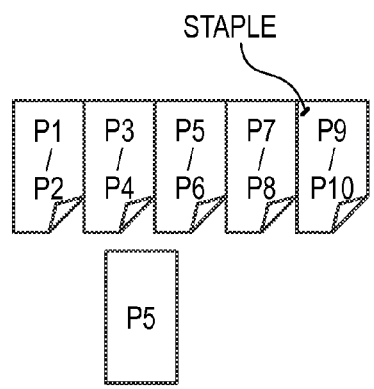

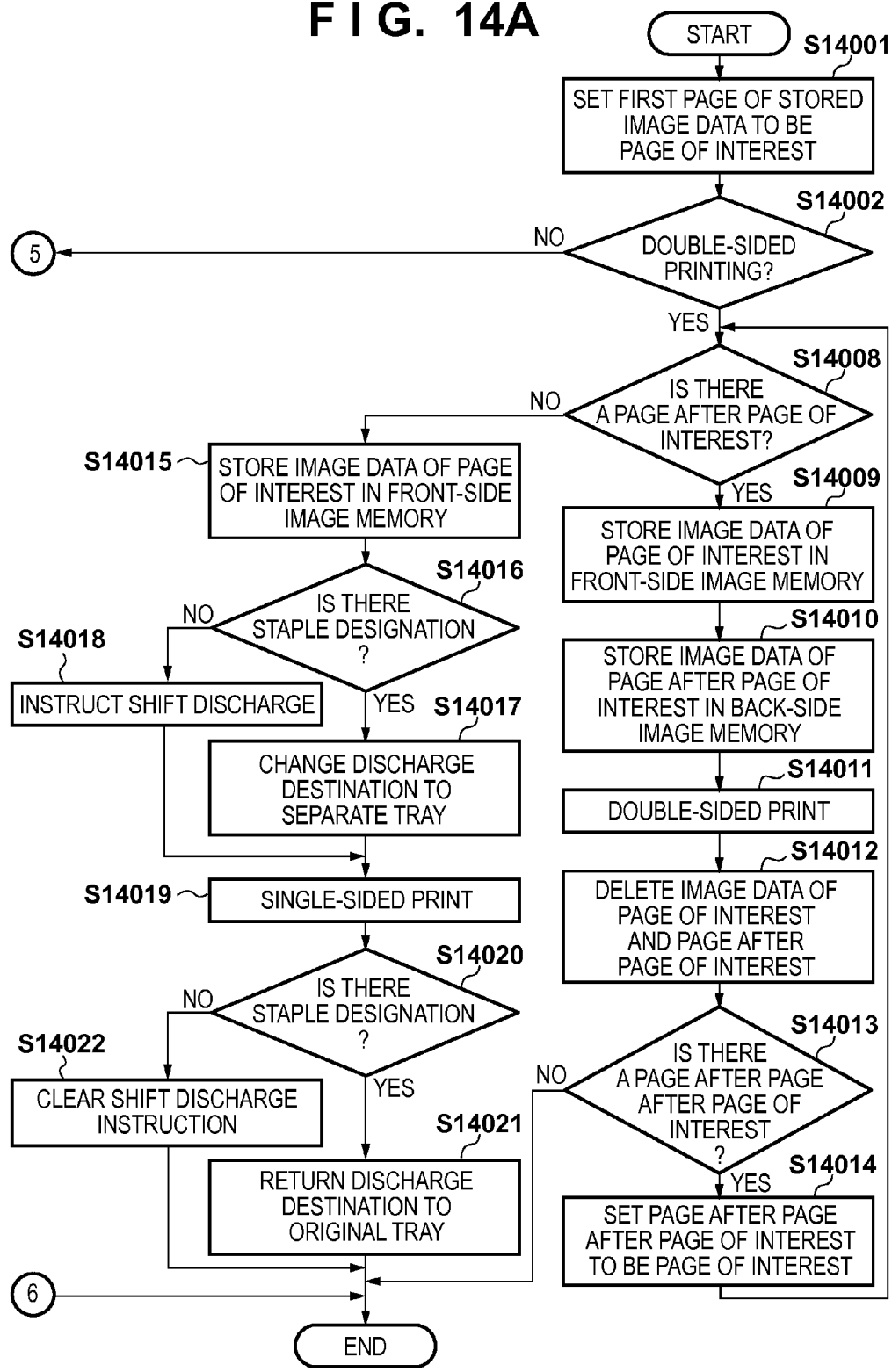

IMAGE FORMING APPARATUS, IMAGE FORMING METHOD

BACKGROUND OF THE INVENTION

1. Field of the Invention

The present invention is related to a technique for double-sided printing of plural pages.

2. Description of the Related Art

In recent years, due to progress in various techniques, image forming apparatuses comprising various functions are being provided. Also, the environment in which image forming apparatuses perform printing is not only an environment where print driver software that corresponds to the image forming apparatus is installed on a client PC for printing, but rather environments have become diversified. For example, there are also environments wherein a host server is controlled from a terminal, and printing is performed via an IPDS protocol via an application on the host server (IPDS is a trademark of IBM). In order to support this kind of environment, there exists a configuration for connecting a host server with an image forming apparatus via an external controller. In this configuration, communication is performed between the host server and the external controller by the IPDS protocol, and communication is performed between the external controller and an image forming apparatus by a protocol that the image forming apparatus supports. In other words, the external controller realizes printing by bidirectionally converting the IPDS protocol to a protocol that the image forming apparatus supports (for example, refer to Japanese Patent Laid-Open No. 2006-178608).

Additionally, by extending a protocol of an image forming apparatus, an industry standard protocol such as IPDS may also be supported. There is a need for a guarantee of an operation according to a standard protocol instruction on the image forming apparatus side according to the type of the instruction. For example, for an external controller and an image forming apparatus, it is necessary to wait for continuing data or an instruction after all image data that is received according to an SRP command of IPDS is printed. For this reason, the external controller controls, for example, an image forming apparatus by transmitting a command (hereinafter referred to as PRP (PrintReceivedPages)) to instruct printing of all received image data. Once the image forming apparatus receives the PRP instruction, and prints all the received image data, it waits for continuing data or a continuing instruction to arrive. Since there is the possibility that continuing data may arrive, for example, even if it is a job for which a designated is made for post-processing such as stapling, the post-processing itself is not executed at that point in time, and preparation is made so that the continuing data can also be post-processed.

However, in a case where a PRP instruction is received in a state in which up until an odd page in a double-sided printing job are input into an image forming apparatus, and the received pages are printed, the odd pages are printed on the front-side while the even pages are printed on the back-side, and printing is performed only on the front-side of the last sheet. Then, the continuing pages that are input afterwards are printed from the front-side of a new sheet. In other words, for the continuing portion, the even pages are printed on the front-side, and the odd pages are printed on the back-side, and there is the possibility that a different printed material than the user intended will be generated. Normally, a host server and an external controller are made such that there is no case where a PRP instruction is received after receiving an odd page in this kind of double-sided printing job. However, when the host server and external controller fall into an unexpected state, in this kind of abnormality, there may be a possibility that a PRP instruction is issued at an unexpected timing. In this case, there is a possibility that a printed material that is not what the user intended will be generated, and that printed sheets will be wasted.

SUMMARY OF THE INVENTION

The present invention was conceived in view of these kinds of problems, and a technique by which protection processing that can generate a printed material intended by a user as much as possible even in such cases can be realized is provided.

According to the first aspect of the present invention, there is provided an image forming apparatus, comprising: a printing unit configured to perform a double-sided print for a plurality of pages; and a deletion unit configured to delete data of a page that the printing unit prints; wherein the deletion unit, in a case where a page printed last by the printing unit out of the plurality of pages is an odd page counting from the first page in a print order, does not delete but stores data of the page printed last.

According to the second aspect of the present invention, there is provided an image forming method that an image forming apparatus comprising a printing unit for performing a double-sided print for a plurality of pages performs, the method comprising: a deletion step of deleting data of a page that the printing unit prints, wherein, in the deletion step, in a case where a page printed last by the printing unit out of the plurality of pages is an odd page counting from the first page in a print order, data of the page printed last is not deleted but stored.

Further features of the present invention will become apparent from the following description of exemplary embodiments (with reference to the attached drawings).

BRIEF DESCRIPTION OF THE DRAWINGS

FIG. 4 is a figure showing a sequence of a process between the image forming apparatus 101 and an external controller 104.

FIG. 11 is a view for illustrating an example configuration of data of jobs.

FIG. 12 is a view for showing an example of a page management example and sheet discharge within an HDD 305.

FIGS. 14A and 14B each is a flowchart for showing details of the processing in step S5110.

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

First Embodiment

In the present embodiment, an explanation will be given for an example of an image forming system that includes an image forming apparatus for which double-sided printing is possible for plural pages. Firstly, an explanation using FIG. 1 will be given for an example configuration of an image forming system 100 according to the present embodiment.

Figure 1:
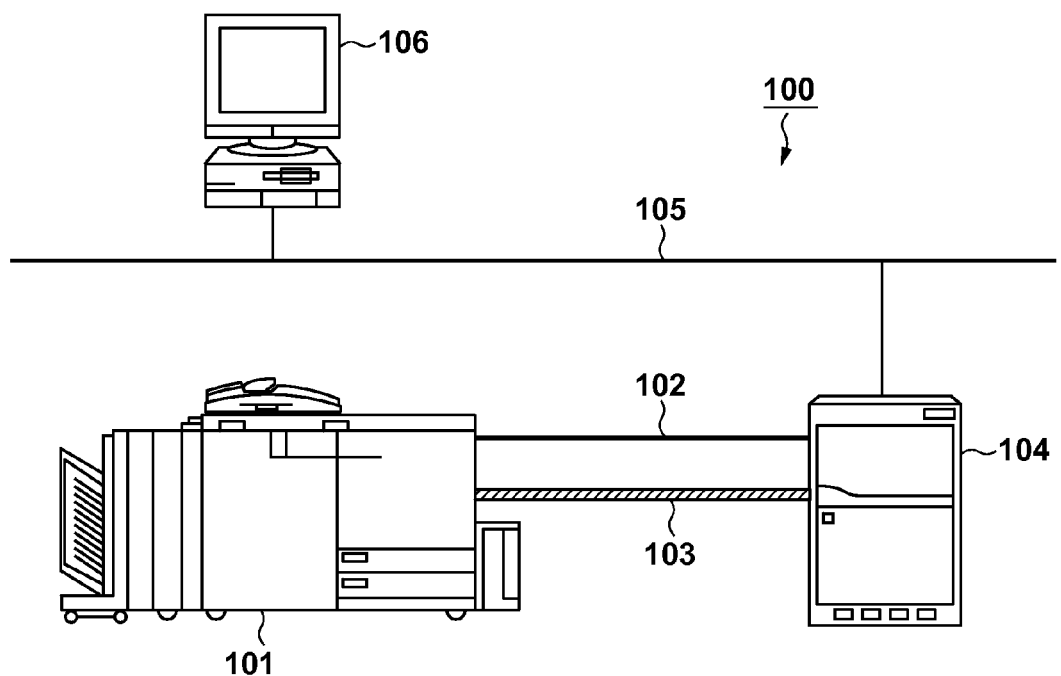
FIG. 1 is a view for illustrating an example configuration of an image forming system 100.

As shown in FIG. 1, an image forming system according to the present embodiment is comprised of a computer terminal 106, an external controller 104 and an image forming apparatus 101. The computer terminal 106 and the external controller 104 are connected by an external network 105, and the external controller 104 and the image forming apparatus 101 are connected by an internal network 102 and a video cable 103.

Figure 2:
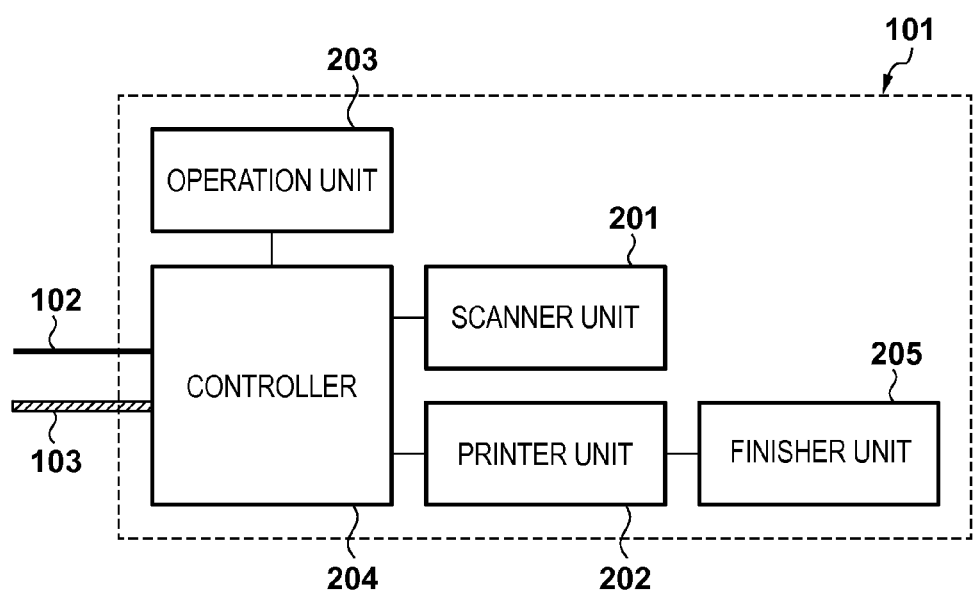
FIG. 2 is a block diagram for showing an example configuration of an image forming apparatus 101.

Firstly, an explanation will be given using a block diagram of FIG. 2 for an example configuration of the image forming apparatus 101. Additionally, FIG. 2 graphically shows only the major elements shown used in processing explained below, and it is not necessarily the case that all of the elements that the image forming apparatus 101 comprises are shown graphically.

An operation unit 203 is configured from a hard key and a touch panel screen, and comprises a user interface function for allowing a user to input various types of instructions, and a display function for displaying various types of information. For example, a user is able to input various types of instructions into the image forming apparatus 101 by making an instructing on a hard key or an instruction unit (button, check box, or the like) displayed on a touch panel screen. Also, the touch panel screen can display various GUIs (Graphical User Interfaces). However, a different configuration that realizes the same functions may be taken for the operation unit 203.

A scanner unit 201 is a device for reading information to be printed to a recording medium such as paper as an image, and the read in image is output by a controller 204. The scanner unit 201 is able to perform reading of the image in, for example, full color.

A printer unit 202 comprises a function for printing an image received from the external controller 104 through the video cable 103 on a recording medium such as paper. For example, a document created on the computer terminal 106 is transmitted from the computer terminal 106 through the external network 105 as page description language (PDL) data to the external controller 104. The external controller 104 receives the transmitted PDL data, expands the received PDL data into an image, and generates image data in a printable format on the image forming apparatus 101. The external controller 104, in addition to transmitting the generated image data to the image forming apparatus 101 through the video cable 103, transmits information regarding image data that is transmitted through the video cable 103 and operation settings during printing through the internal network 102. The controller 204 controls the printer unit 202, and initiates printing based on image data received through the video cable 103 from the external controller 104 and information received through the internal network 102. In this way, the image forming system 100 according to the present embodiment realizes printing on the image forming apparatus 101 based on PDL data transmitted through a network from the computer terminal 106, and realizes a so-called network printing function.

Also, in the case that the image read in by the scanner unit 201 is received through the external controller 104, the printer unit 202 prints the image on a recording medium, and is a device for executing a so-called copy function. The printer unit 202 is able to perform printing of the image in, for example, full color.

On a downstream side of the printer unit 202, a finisher unit 205 is arranged for performing post-processing such as stapling, or the like, on a recording medium on which printing was performed by the printer unit 202. Additionally, it is not necessary for the image forming apparatus 101 to necessarily comprise the finisher unit 205, and the finisher unit 205 may be a separate device to the image forming apparatus 101.

In addition to performing operation control of each functional unit that configures the image forming apparatus 101, the external controller 104 performs control of data communication between the external controller 104, and performs status management processing, image processing, or the like, for the image forming apparatus 101.

Figure 3:
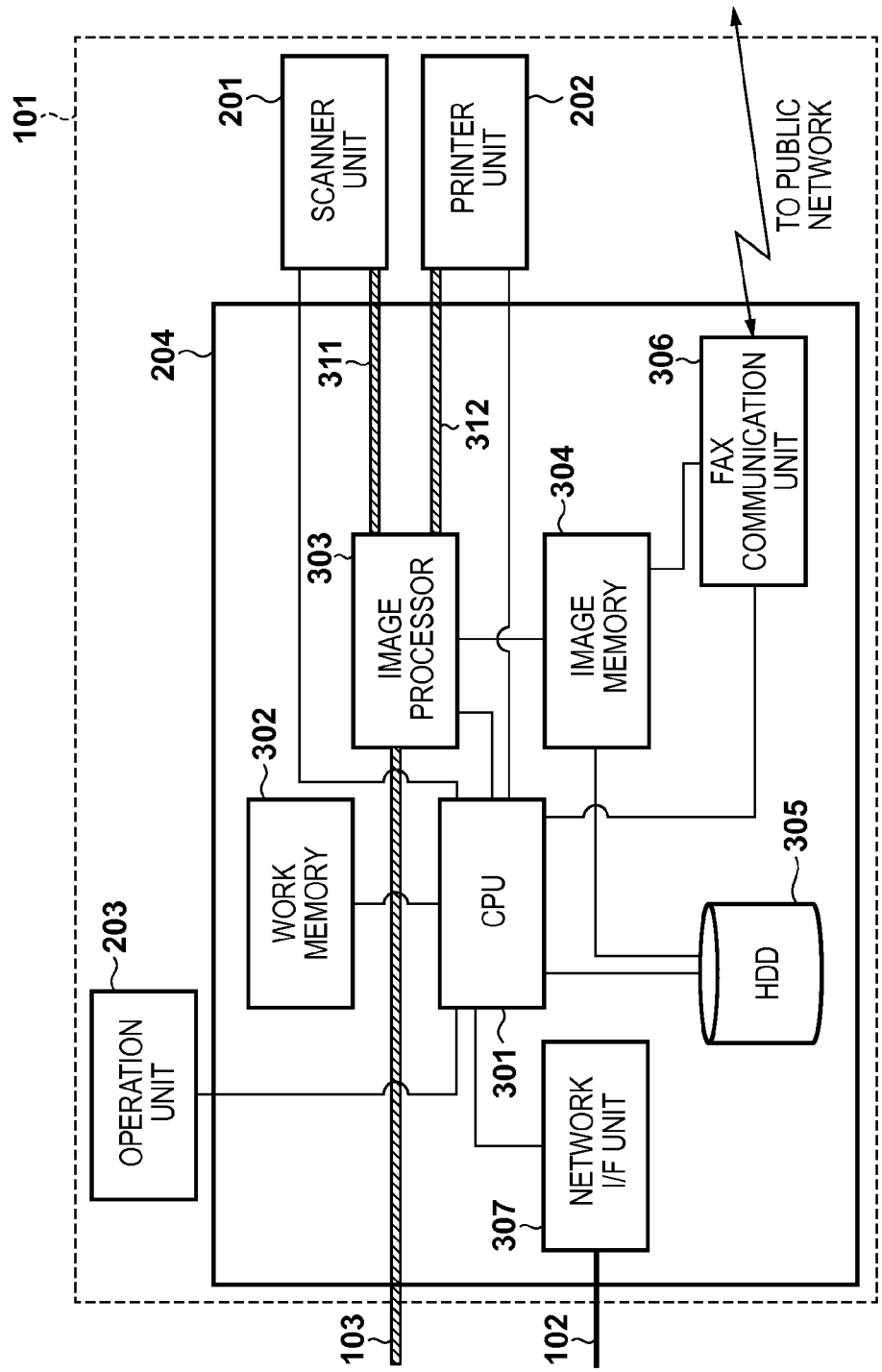
FIG. 3 is a block diagram for showing an example configuration of a controller 204.

Next, an explanation will be given using a block diagram of FIG. 3 for an example configuration of the controller 204.

In addition to a CPU 301 using data and a computer program stored in a work memory 302 to perform operation control of each unit that configures the image forming apparatus 101, it also controls and executes each process that is explained as being performed by the controller 204. Also, the CPU 301 performs control of data communication with external equipment.

The work memory 302 comprises a work area that is used upon execution of various types of processing by the CPU 301, and an area for temporarily storing data and computer programs that are loaded from an HDD 305. In other words, the work memory 302 is able to provide each kind of area appropriately.

An OS (an operating system), computer programs that are the target of execution by the CPU 301 and data are saved in the HDD 305. The computer programs and the data saved in the HDD 305 are loaded to the work memory 302 as appropriate according to control by the CPU 301, and are targets of processing by the CPU 301.

A network I/F unit 307 is for connecting the image forming apparatus 101 to the internal network 102 explained above, and serves as an interface for data communication performed with the external controller 104 that is connected to the internal network 102.

An image processor 303 stores an image received from the external controller 104 through the video cable 103 and an image received from the scanner unit 201 through a signal line 311 to an image memory 304. Then, the image processor 303 executes each type of image processing on the image, and saves the image for which image processing is finished to the HDD 305, and sends it to the printer unit 202 through a signal line 312.

For example, in the case that a user operates the operation unit 203 and inputs a copy instruction, the image processor 303 transmits an image read from the scanner unit 201 (image processed) to the printer unit 202 through the signal line 312. At that time, the CPU 301 transmits information included in the foregoing copy instruction (information that shows whether it is double-sided printing or single-sided printing, information that shows an output destination tray, information necessary for printing, or the like) to the printer unit 202. Because of this the printer unit 202 prints the image (image processed) read from the scanner unit 201 to the recording medium according to the copy instruction, and as a result a copy function can be realized.

Also, the image (image processed) received from the external controller 104 through the video cable 103 is saved to the HDD 305 by the image processor 303. After this, in the case of printing the image on the printer unit 202, the image is read out to an appropriate area of the image memory 304 from the HDD 305 by the image processor 303, and the image that is read out is transmitted to the printer unit 202. At that time, the CPU 301 transmits the information received (information that shows whether it is double-sided printing or single-sided printing, information that shows an output destination tray, information necessary for printing, or the like) from the external controller 104 through the network I/F unit 307 to the printer unit 202.

Of course, for the copy function, after the image (image processed) read out by the scanner unit 201 is saved to the HDD 305, a configuration may be taken such that the image is printed by the printer unit 202. In this case the image processor 303 reads out the image to an appropriate area of the image memory 304 from the HDD 305, and transmits the image that was read out to the printer unit 202. At that time, the CPU 301 transmits information included in the copy instruction (information that shows whether it is double-sided printing or single-sided printing, information that shows an output destination tray, and information necessary for printing, or the like) to the printer unit 202.

The image memory 304 is arranged with an area that can store a plurality of pages worth of image data. The image memory 304 is arranged with a front-side area for storing data of image data that is to be printed on a front-side of a recording medium (referred to hereinafter as a sheet), and a back-side area for storing data of image data that is to be printed on a back-side of a sheet. However, if the image is an image to be printed on a front-side, data of the image is stored in the front-side area, and if the image is an image to be printed on a back-side, then data of the image is stored in the back-side area.

A FAX communication unit 306 is for performing a facsimile communication with an external device through a public network, and transmits data stored in the HDD 305 and the image memory 304 to an external unit, and saves facsimile data received from an external unit to the HDD 305.

According to the above described configuration, for example, using a function for storing an image to the HDD 305, it is possible to accumulate data of an image input from the scanner unit 201 to the HDD 305 without immediately outputting to an external unit. Or it is possible to accumulate data of an image input from the external controller 104 through the video cable 103 to the HDD 305 without immediately outputting to an external unit. Thereby, a so-called box function is realized. According to the box function, it is possible to print/fax the images stored on the HDD 305 when a user wishes to print or perform a fax transmission, and to share images accumulated on the HDD 305 between a plurality of users in accordance to an instruction from the operation unit 203.

Furthermore, according to the configuration described above, a file transmission function can be realized wherein an image stored in the HDD 305 is sent to a desired computer terminal connected to the external network 105, and reused by the computer terminal. For the file transmission function, the image processor 303 converts the image stored on the HDD 305 into a file format of an image generally used by computer terminals etc (for example Jpeg, or the like). In this way, the converted file can be sent to a desired computer terminal through the network I/F unit 307, the internal network 102, the external controller 104, and the external network 105.

Also, according to the configuration described above, the controller 204 can transmit data stored in the HDD 305 to the computer terminal 106 through the internal network 102 and the external controller 104 by a web service, or the like. Also, conversely, information from the computer terminal 106 can be stored to the image memory 304 and the HDD 305 through the internal network 102 and the external controller 104 by a Web service, or the like. Thereby, a remote operation service is provided wherein a status of the image forming apparatus 101 can be referenced by the computer terminal 106, and setting of the image forming apparatus 101 is can be performed by the computer terminal 106. Also, the HDD 305 is arranged with a print job storage area which will be explained later.

Figure 7:
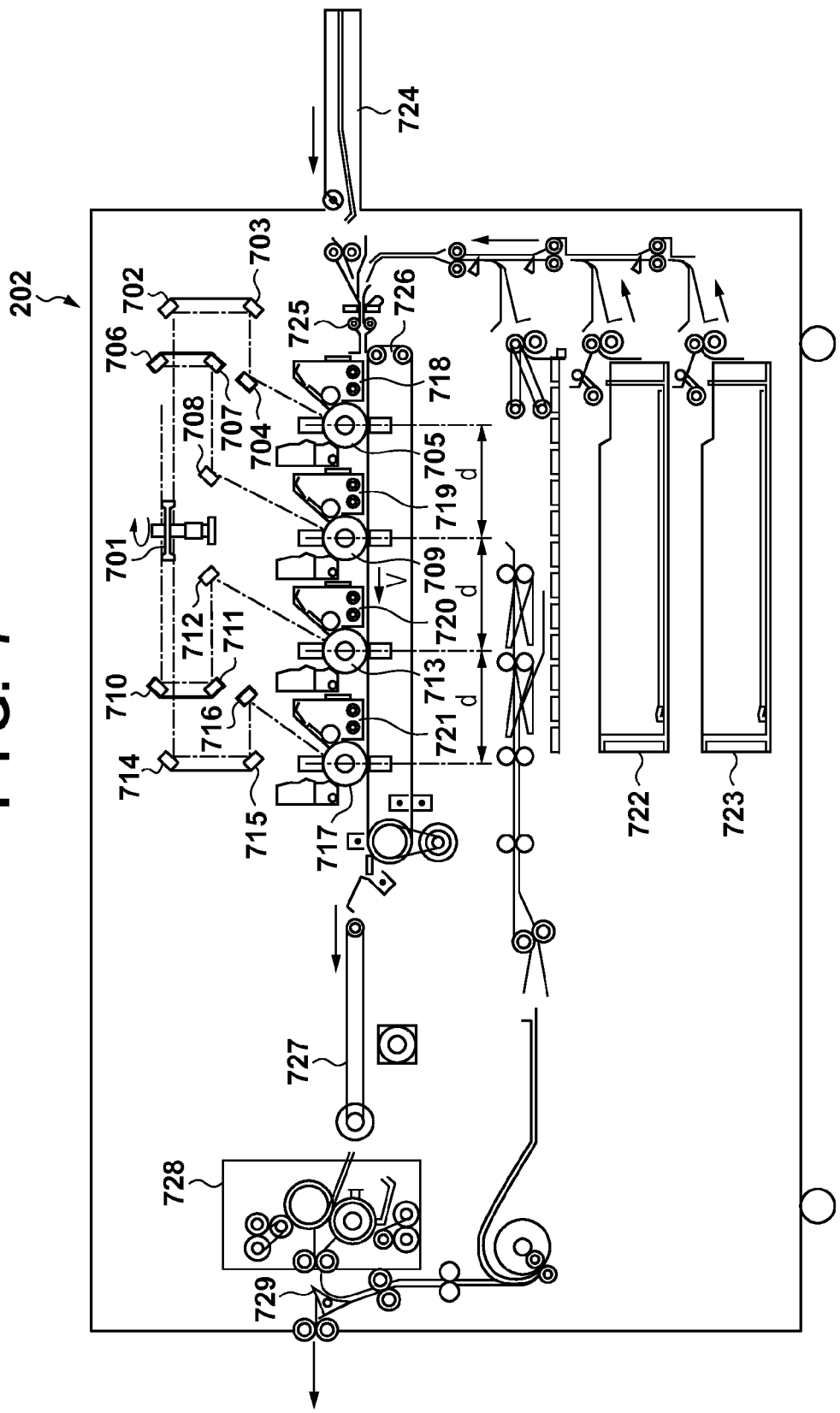
FIG. 7 is a view for illustrating an example configuration of a printer unit 202.

Next, explanation will be given for an example configuration of the printer unit 202 using FIG. 7. Additionally, the configuration shown in FIG. 7 is nothing more than an example of a configuration that is applicable to the printer unit 202, and so long as it comprises equivalent or greater functions, any configuration may be employed.

A polygon mirror 701 receives four laser beams that are emitted from a semiconductor laser driving unit. One of the laser beams scans a photosensitive drum 705 passing mirrors 702, 703 and 704. Another one of the laser beams scans a photosensitive drum 709 passing mirrors 706, 707 and 708. Furthermore, another one of the laser beams scans a photosensitive drum 713 passing mirrors 710, 711 and 712. Furthermore, another one of the laser beams scans a photosensitive drum 717 passing mirrors 714, 715 and 716.

Meanwhile, a developer 718 supplies a yellow (Y) toner, and in accordance with scanning of the laser beam, a latent image that is formed on the photosensitive drum 705 is developed and a yellow toner image is formed. A developer 719 supplies a magenta (M) toner, and in accordance with scanning of the laser beam, a latent image that is formed on the photosensitive drum 709 is developed and a magenta toner image is formed. A developer 720 supplies a cyan (C) toner, and in accordance with scanning of the laser beam, a latent image that is formed on the photosensitive drum 713 is developed and a cyan toner image is formed. Furthermore, a developer 721 supplies a black toner, and in accordance with scanning of the laser beam, a latent image that is formed on the photosensitive drum 717 is developed and a black toner image is formed. The toner images of the above described four colors (Y, M, C, K) are transferred to a sheet (hereinafter referred to as a sheet), and an output image of full color can be obtained.

A sheet fed by either of sheet cassettes 722 and 723 or a manual feed tray 724 passes through a registration roller 725, is pulled in by a transfer belt 726, and conveyed. A toner of each color is developed beforehand on photosensitive drums 705, 709, 713 and 717, and in synchronization with a timing of sheet feeding, and toner is transferred to a sheet in conjunction with conveyance of the sheet. A sheet to which a toner of each color is transferred is separated from the transfer belt 726 and conveyed to a fixing unit 728 by a conveyer belt 727. The toner is fixed to the sheet in the fixing unit 728. A sheet that detaches from the fixing unit 728 is guided temporarily in a downward direction by a flapper 729, and after a trailing edge of the sheet detaches from the flapper 729, a switchback is performed and the sheet is discharged. Because of this, the sheet is discharged in a face-down state, and when printing sequentially from the first page, the correct page order is achieved.

Additionally, the photosensitive drums 705, 709, 713 and 717 are arranged to be evenly spaced apart by a distance d, and the sheet is conveyed at a constant velocity v (however, this is unrelated to a moving speed v of a mirror unit of the scanner unit) by the conveyer belt 727. The polygon mirror 701 and a semiconductor laser are driven such that a toner image is formed on a photosensitive drum in synchronization with a timing according to these kinds of positional relationships and the conveying speed.

Figure 8:
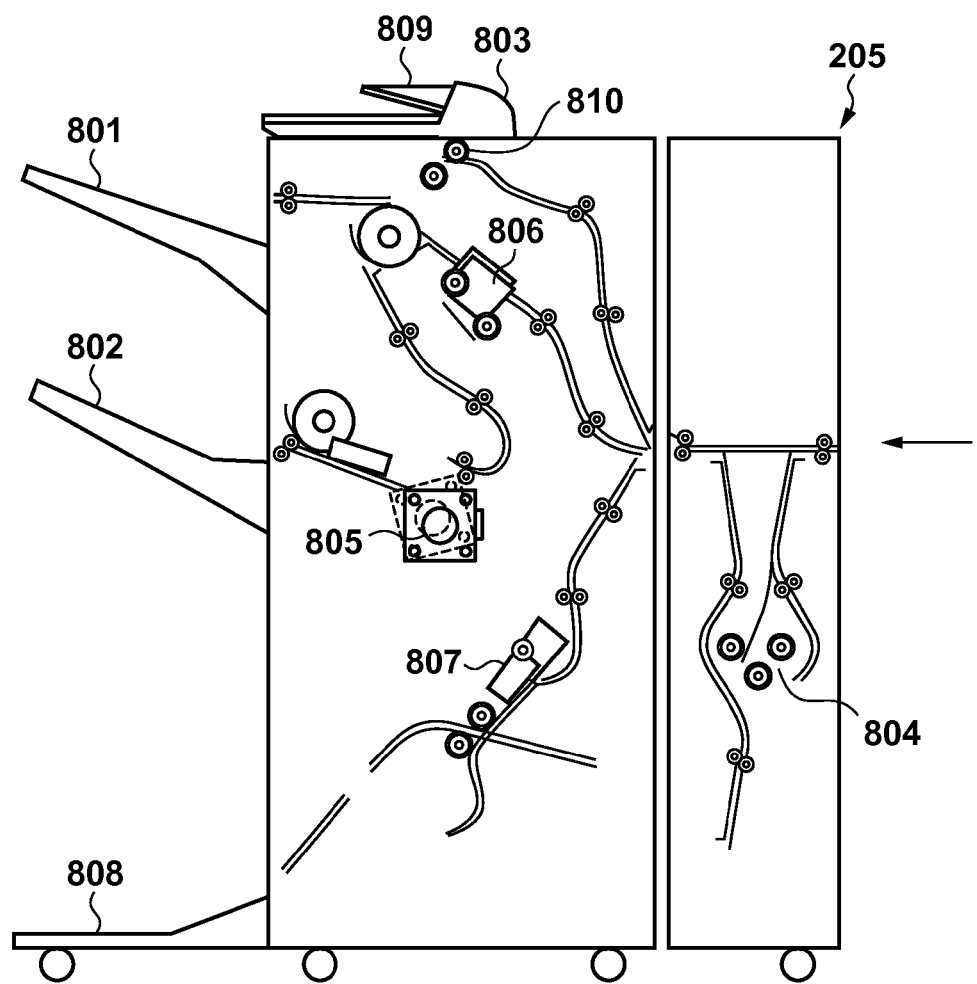
FIG. 8 is a view for illustrating an example configuration of a finisher unit 205.

Next, an explanation will be given for an example configuration of the finisher unit 205 using FIG. 8. Additionally, the configuration shown in FIG. 8 is nothing more than an example of a configuration that is applicable the finisher unit 205, and so long as it comprises equivalent or greater functions, any configuration may be employed.

A sheet that passes through the fixing unit 728 of the printer unit 202 and is discharged, enters the finisher unit 205. The finisher unit 205 includes an escape tray 801 and a stack tray 802, and a discharging destination tray is switched in accordance with the number of sheets that are discharged and the type of the job.

There are two sorting methods. One is a bin sort method of sorting output sheets into a bin for each job using a plurality of bins. The other method is a shift sort method of sorting an output sheet for each job by shifting a bin (or a tray) to in a direction away/toward the viewer of the drawing in FIG. 8 and an electronic sorting function described later. The electronic sorting function is referred to as collating. If the controller 204 that was previously described has a large capacity memory (for example the image memory 304, the HDD 305), this memory is used for changing a buffered page order and discharge order, and by using the so-called collation function, an electronic sorting function can be supported. Note that while sorting sorts each job, a grouping function is a function for sorting each page.

Furthermore, in the case of discharging to the stack tray 802, the sheets that are discharged prior to a sheet are stored for each job, and immediately before being discharged, can be stapled by a stapler 805. Also, before reaching the above described two trays there is also a z-folding device 804 for folding a paper in a Z shape, and a puncher 806 for performing hole punching of two holes (or three holes) for filing, and respective processing is performed according to the type of the job.

Furthermore, after binding of a central portion of sheets is performed in two places, a saddle stitcher 807 performs processing to create a booklet like a pamphlet or a weekly magazine by making it such that the central portion of the sheets is pinched by a roller, thereby folding the sheets in half. The sheets that are bound by the saddle stitcher 807 are discharged to a booklet tray 808.

Also, while not shown in FIG. 8, adding a finisher such as a binding by a glue (gluing) to achieve book binding, or a trim (cutting) to ensure that a binding side and an end surface of an opposite side conform after binding, is also possible.

Also, an inserter 803 is for sending a sheet set to a tray 809 to one of, the escape tray 801, the stack tray 802, or the booklet tray 808 without going through the printer. In this way, a sheet that was set by the inserter 803 can be inserted (insertion) between sheets that are sent to the finisher unit 205. Sheets that are to be inserted are set by a user in a face-up state in the tray 809 of the inserter 803, and fed in order starting from a sheet that is at the uppermost part by a pick-up roller 810 into the finisher unit 205. Accordingly, by conveying a sheet from the inserter 803 as is to the escape tray 801 and the stack tray 802, it is discharged in a face-down state. Note that, in the case of sending recording paper to the saddle stitcher 807, after first sending the recording paper to the puncher 806 side, by performing the switchback and then sending it, the direction of the face is matched.

Figure 9:
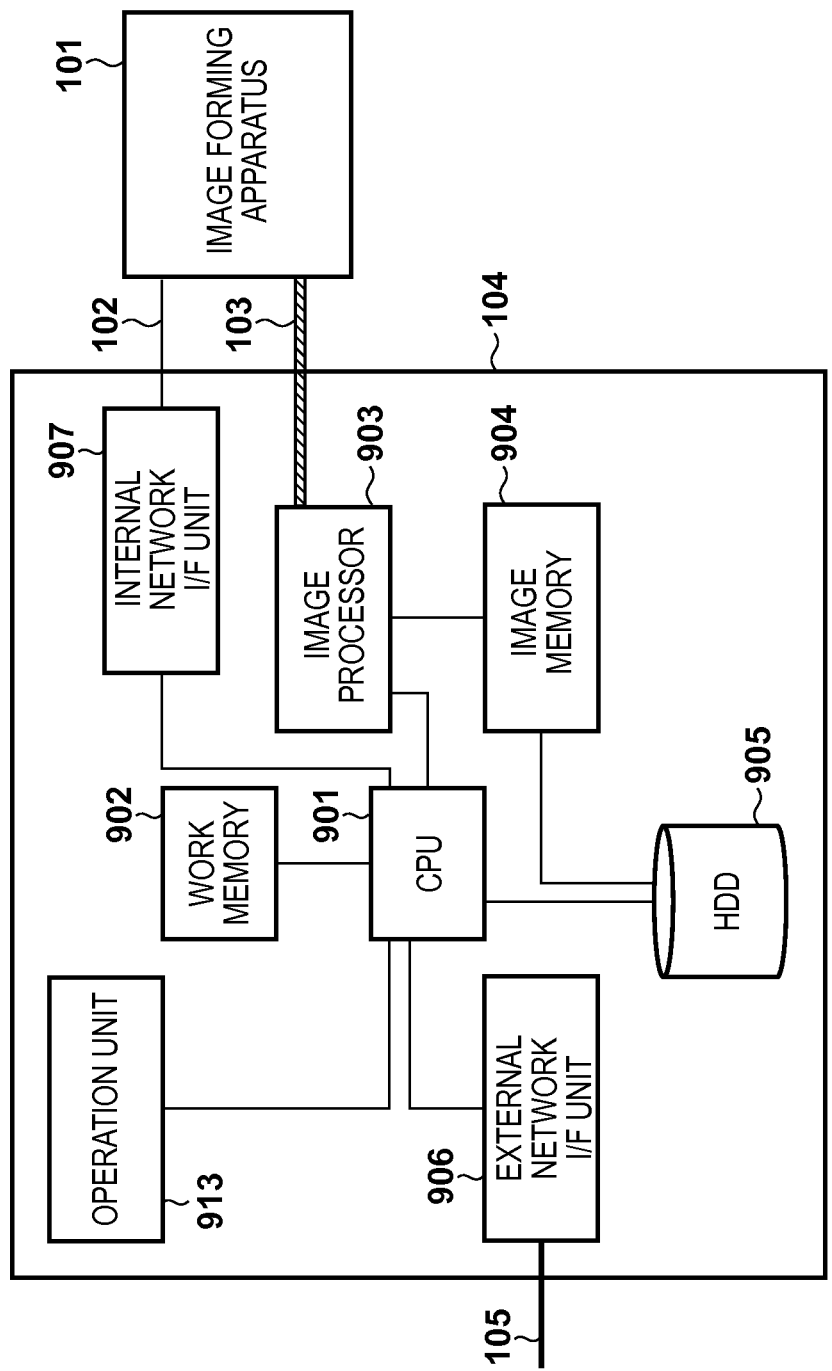
FIG. 9 is a block diagram for showing an example configuration of the external controller 104.

Next, an explanation will be given using a block diagram of FIG. 9 for an example configuration of the external controller 104.

An operation unit 913 is configured from a hard key and a touch panel screen, and comprises a user interface function for allowing a user to input various types of instructions, and a display function for displaying various types of information. For example, a user is able to input various types of instructions into the external controller 104 by making an instructing on a hard key or an instruction unit (button, check box, or the like) displayed on a touch panel screen. Also, the touch panel screen can display various GUIs (Graphical User Interfaces). However, a different configuration that realizes the same functions may be taken for the operation unit 913. A CPU 901 uses data and computer programs stored in a work memory 902 to perform operation control of each unit that configures the external controller 104, and it also controls and executes each process that is explained as being performed by the external controller 104. Also, the CPU 901 performs control of data communication with external equipment.

The work memory 902 comprises a work area that is used upon execution of various types of processing by the CPU 901, and an area for temporarily storing data and computer programs that are loaded from an HDD 905. In other words, the work memory 902 is able to provide each kind of area appropriately.

An OS (an operating system), computer programs that are the target of execution by the CPU 901, and data are saved in the HDD 905. The computer programs and the data saved in the HDD 905 are loaded into the work memory 902 as appropriate according to control by the CPU 901, and are targets of processing by the CPU 901.

An external network I/F unit 906 is for connecting the external controller 104 to the above described external network 105. The external network I/F unit 906 functions as an interface for data communication performed with the computer terminal 106 which is connected to the external network 105.

An internal network I/F unit 907 is for connecting the external controller 104 to the above described internal network 102. The internal network I/F unit 907 functions as an interface for data communication performed with the image forming apparatus 101 which is connected to the internal network 102.

An image processor 903 loads PDL data into an image memory 904 as an image when the PDL data is inputted into the apparatus via the external network 105 and the external network I/F unit 906 from the computer terminal 106 and saved in the HDD 905. Then, the image processor 903 transmits the image that is loaded into the image memory 904 to the image forming apparatus 101 via the video cable 103. Also, the CPU 901 transmits print attribute information inputted into the apparatus via the external network 105 and the external network I/F unit 906 from the computer terminal 106 to the image forming apparatus 101 via the internal network I/F unit 907 and the internal network 102. This print attribute information is information explained as something that the network I/F unit 307 of the controller 204 receives from the external controller 104. As described above, information pertaining to a loaded image (the size, or the like), and print setting information included in the PDL data (settings for when printing is executed on the image forming apparatus 101) is included.

Next, explanation will be given using FIG. 4 for a sequence of processing performed between the external controller 104 and the image forming apparatus 101 in order to cause the image forming apparatus 101 to perform double-sided printing of a plurality of pages. It is assumed that time elapses in the direction from the upper side of FIG. 4 toward the lower side of FIG. 4. In FIG. 4, after a print job for each page from the first page (the first page) to the fifth page are inputted into the image forming apparatus 101, a PRP (Print Received Pages) instruction is made from the external controller 104 to the image forming apparatus 101. A case is shown in which after this, a print job for each page from the sixth page to the tenth page are input as subsequent pages.

Firstly, the external controller 104 transmits a job initiation instruction to the image forming apparatus 101 (4001). With this, Job#1 is generated on the image forming apparatus 101 side.

Next, the external controller 104 transmits a job setting instruction, i.e. the above described print setting information, to the image forming apparatus 101 (4002). In this print setting information, settings such as whether the printer is a double-sided print or a single-sided print, whether or not to perform stapling processing, or the like, are included. In the example of FIG. 4, an instruction for a double-sided print (Duplex) and a staple setting (Staple) are included.

Next, the external controller 104 transmits images for the first page-the fifth page (Page #1-Page #5) to the image forming apparatus 101 (4003-4007 respectively).

After that, the external controller 104 transmits a PRP instruction according to the instruction from the computer terminal 106 to the image forming apparatus 101 (4008). The image forming apparatus 101, having received the PRP instruction, prints, in a double-sided printing, the images of all of the pages (the first page-the fifth page) that are currently received and stored. With this, the image of the first page is printed on the front-side of the first sheet, the image of the second page is printed on the back-side of the first sheet, and the image of the third page is printed on the front-side of the second sheet. Also, the image of the fourth page is printed on the back-side of the second sheet, and the image of the fifth page is printed on the front-side of the third sheet.

In addition, even if post-processing such as stapling is designated, the post-processing itself is not executed at that point in time, and rather preparation is performed so that it is possible to perform the post-processing together with continuing data.

Next, the external controller 104 transmits images for the sixth page-the tenth page (Page #6-Page #10) to the image forming apparatus 101 (4009-4013 respectively). After that, because the external controller 104 transmits a job completion instruction to the image forming apparatus 101, the image forming apparatus 101 prints from the fifth page to the tenth page in double-sided printing when the job completion instruction is received.

Here, for the example configuration of the data of each job, explanation will be given using FIG. 11. Note that the configuration of the job data is not limited to the configuration shown in FIG. 11. In FIG. 11, a case in which a plurality of jobs including a job 1 and a job 2 are input into the image forming apparatus 101 (the HDD 305) is shown.

The data of both of the jobs includes job setting information, which is print setting information, and image data for each printing target page in the jobs. In the case of job 1, the job setting information {perform double-sided printing; staple; discharge destination is the stack tray 802}, and the image data for the first page-the fifth page is included. In the case of job 2, the job setting information {perform single-sided printing; do not staple; discharge destination is the stack tray 802}, and the image data for the first page-the fourth page is included.

Figure 5A:
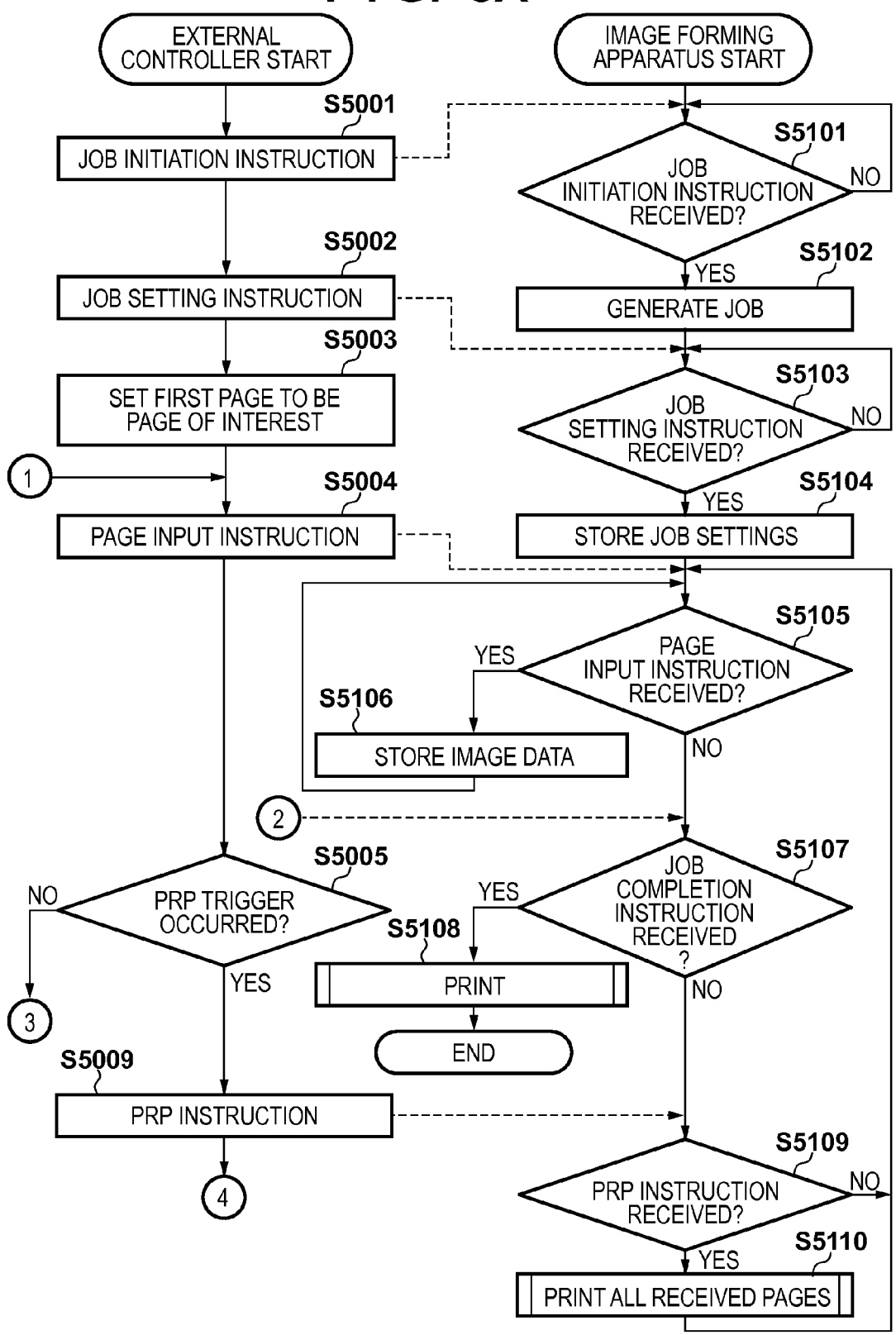
FIGS. 5A and 5B each is a flowchart of processing performed by the image forming apparatus 101 and the external controller 104.
Figure 5B:
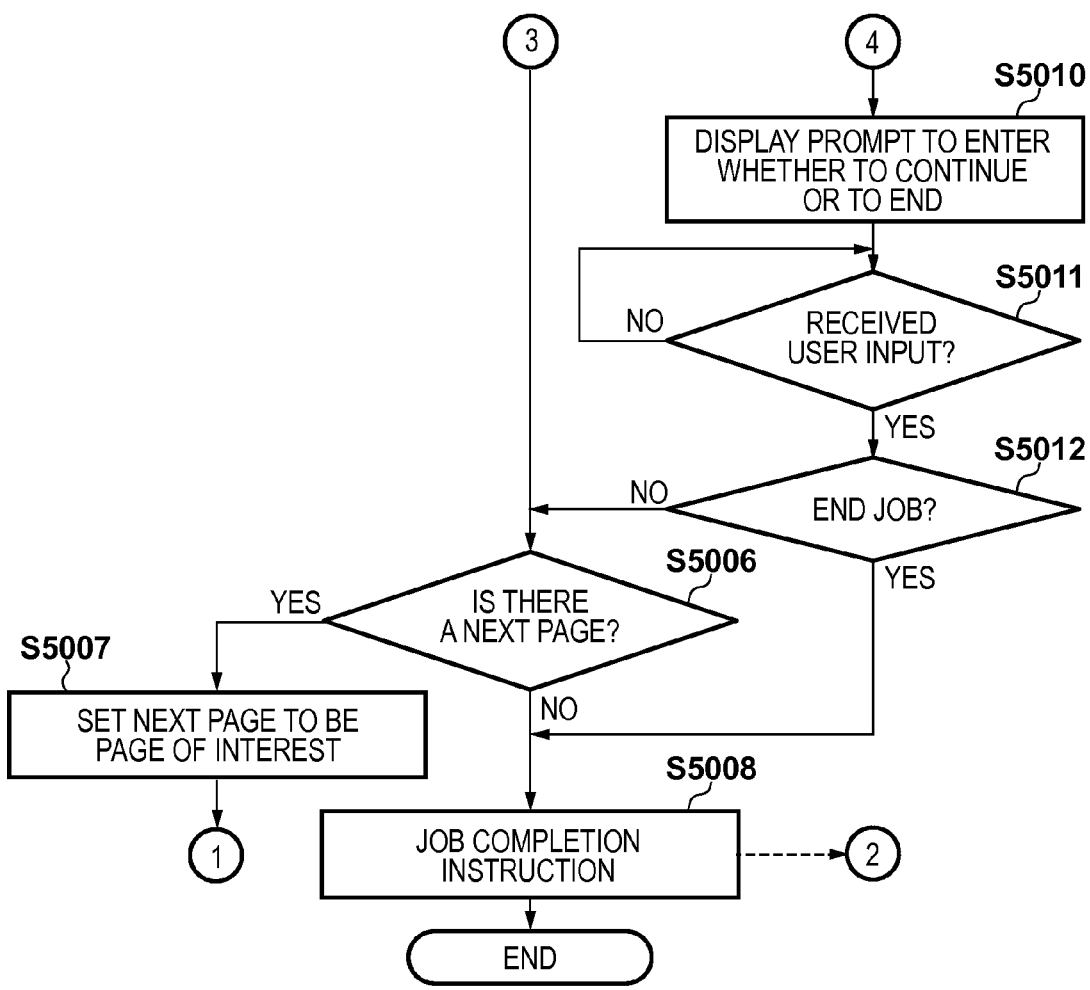

Next, using the flowchart of each of FIGS. 5A and 5B, explanation will be given for processing that the external controller 104 and the image forming apparatus 101 perform in order to cause the image forming apparatus 101 to perform a double-sided print of a plurality of pages.

In step S5001, the CPU 901 transmits the above described job initiation instruction to the image forming apparatus 101 via the internal network I/F unit 907 and the internal network 102.

In step S5002, the CPU 901 transmits the above described job setting instruction to the image forming apparatus 101 via the internal network I/F unit 907 and the internal network 102.

In step S5003, the CPU 901 sets the first page out of the pages to be transmitted to be the page of interest. In step S5004, the CPU 901 controls the image processor 903 to read the image of the page of interest from the HDD 905 into the image memory 904, and transmits the read image to the image forming apparatus 101 via the video cable 103.

In step S5005, the CPU 901 determines whether or not an instruction to transmit a PRP instruction has arrived from the computer terminal 106 via the external network 105 and the external network I/F unit 906. In a case where the result of this determination is that this kind of instruction has arrived, the processing proceeds to step S5009, and in a case where no such instruction has arrived, the processing proceeds to step S5006.

In step S5006, the CPU 901 determines whether or not the page of interest is the final page to be transmitted. When the result of the determination is that the page of interest is the final page, the processing proceeds to step S5008, and when the page is not the final page, the processing proceeds to step S5007. In step S5007, the CPU 901 sets the page after the page of interest to the new page of interest, and the processing returns to step S5004.

Meanwhile, in step S5008, the CPU 901 transmits the above described job completion instruction to the image forming apparatus 101 via the internal network I/F unit 907 and the internal network 102. However, the image forming apparatus 101, having received the job completion instruction, prints in a double-sided print the images of all of the pages received from the external controller 104.

Meanwhile, in step S5009, the CPU 901 transmits the PRP instruction to the image forming apparatus 101 via the internal network I/F unit 907 and the internal network 102.

Figure 10:
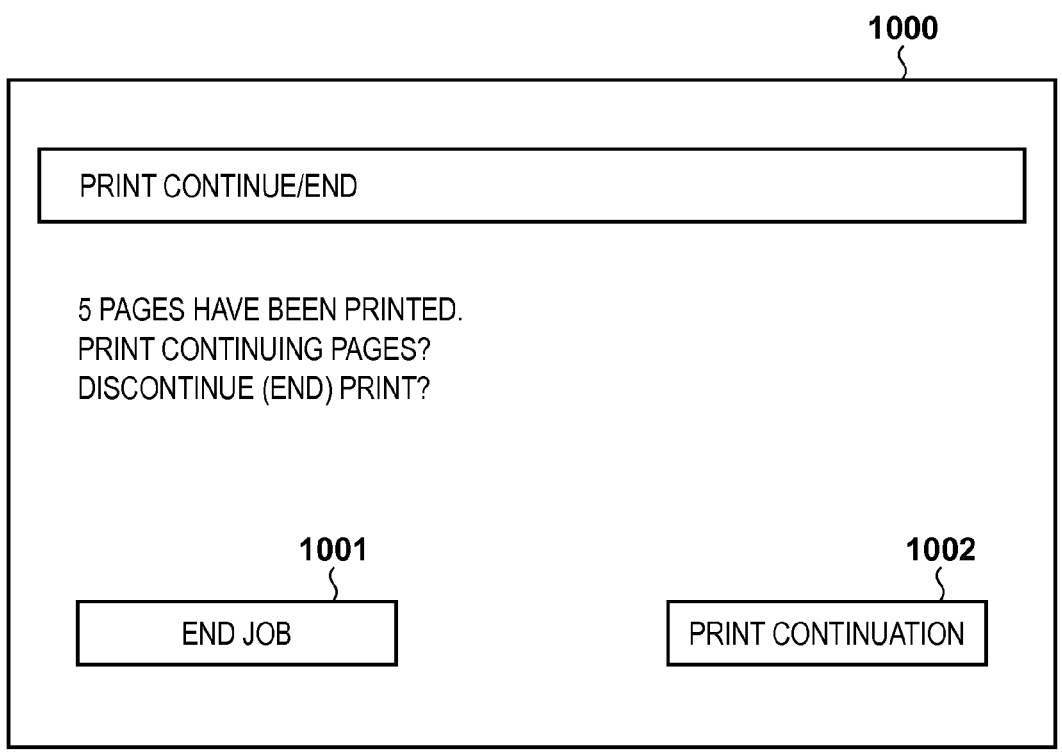
FIG. 10 is a view for illustrating a display example of a GUI.

In step S5010, the CPU 901 displays a GUI 1000 as is exemplified in FIG. 10 to a display screen comprised in the operation unit 913. The GUI 1000 exemplified in FIG. 10 is something that allows a user to select whether to perform printing of pages that continue from the page last transmitted to the image forming apparatus 101, or to cause the print processing to end at this point in time. When the CPU 901 detects that the user makes an instruction on a button 1001 or a button 1002, the processing proceeds to step S5012 via step S5011. Note that the instruction on the button 1001 or the button 1002 may be performed using a hard key, or may be performed by tapping the button 1001 or the button 1002 on a touch panel screen. Meanwhile, the processing stands by at step S5011 so long as the CPU 301 does not detect an instruction on the button 1001 or the button 1002.

In the step S5012, the CPU 901 determines whether an instruction is made on the button 1001 or the button 1002. If the result of this determination is that an instruction is made on the button 1001, the processing proceeds to step S5006, and if the result of the determination is that an instruction is made on the button 1002, the processing proceeds to step S5008.

In step S5101, the CPU 301 determines whether or not a job initiation instruction transmitted via the internal network 102 from the external controller 104 is received via the network I/F unit 307. If the result of this determination is that such an instruction is received, the processing proceeds to step S5102, and if the result of the determination is that such an instruction is not received, the processing stands by in step S5101.

In step S5102, the CPU 301 generates a job in accordance with the received job initiation instruction. When a job that has been generated previously is job #N, the job is generated in the HDD 305 as job # (N+1) in this step.

In step S5103, the CPU 301 determines whether or not a job setting instruction transmitted via the internal network 102 from the external controller 104 is received via the network I/F unit 307. If the result of this determination is that such an instruction is received, the processing proceeds to step S5104 and if the result of the determination is that such an instruction is not received, the processing stands by in step S5103.

In step S5104, the CPU 301 saves the received job setting instruction in the HDD 305.

In step S5105, the CPU 301 determines whether or not the image processor 303 received the image of a page transmitted via the video cable 103 from the external controller 104. If the result of this determination is that it is received, the processing proceeds to step S5106, and if the result of the determination is that such an instruction is not received, the processing proceeds to step S5107. In step S5106, the CPU 301 saves a received page image in the HDD 305.

In step S5107, the CPU 301 determines whether or not a job completion instruction transmitted via the internal network 102 from the external controller 104 is received via the network I/F unit 307. If the result of this determination is that such an instruction is received, the processing proceeds to step S5108, and if the result of the determination is that such an instruction is not received, the processing proceeds to step S5109.

In step S5108, the CPU 301 reads the job setting instruction saved in the HDD 305 in step S5104 and transmits it to the printer unit 202. Also, the CPU 301 by controlling the image processor 303 reads the image of each page saved in the HDD 305 sequentially into the image memory 904, and transmits the read images to the printer unit 202. With this, it is possible to cause the printer unit 202 to print the image of each page in accordance with the job setting instruction. Details of the processing in step S5108 will be explained later using the flowchart of FIG. 6.

Meanwhile, in step S5109, the CPU 301 determines whether or not a PRP instruction transmitted via the internal network 102 from the external controller 104 is received via the network I/F unit 307. If the result of this determination is that such an instruction is received, the processing proceeds to step S5110, and if the result of the determination is that such an instruction is not received, the processing returns to step S5105.

In step S5110, the CPU 301 reads the job setting instruction saved in the HDD 305 in step S5104 and transmits it to the printer unit 202. Also, the CPU 301 by controlling the image processor 303 reads the image of each page saved in the HDD 305 sequentially into the image memory 904, and transmits the read images to the printer unit 202. With this, it is possible to cause the printer unit 202 to print the image of each page in accordance with the job setting instruction. Details of the processing in step S5110 will be explained later using the flowchart of FIG. 13.

Figure 6:
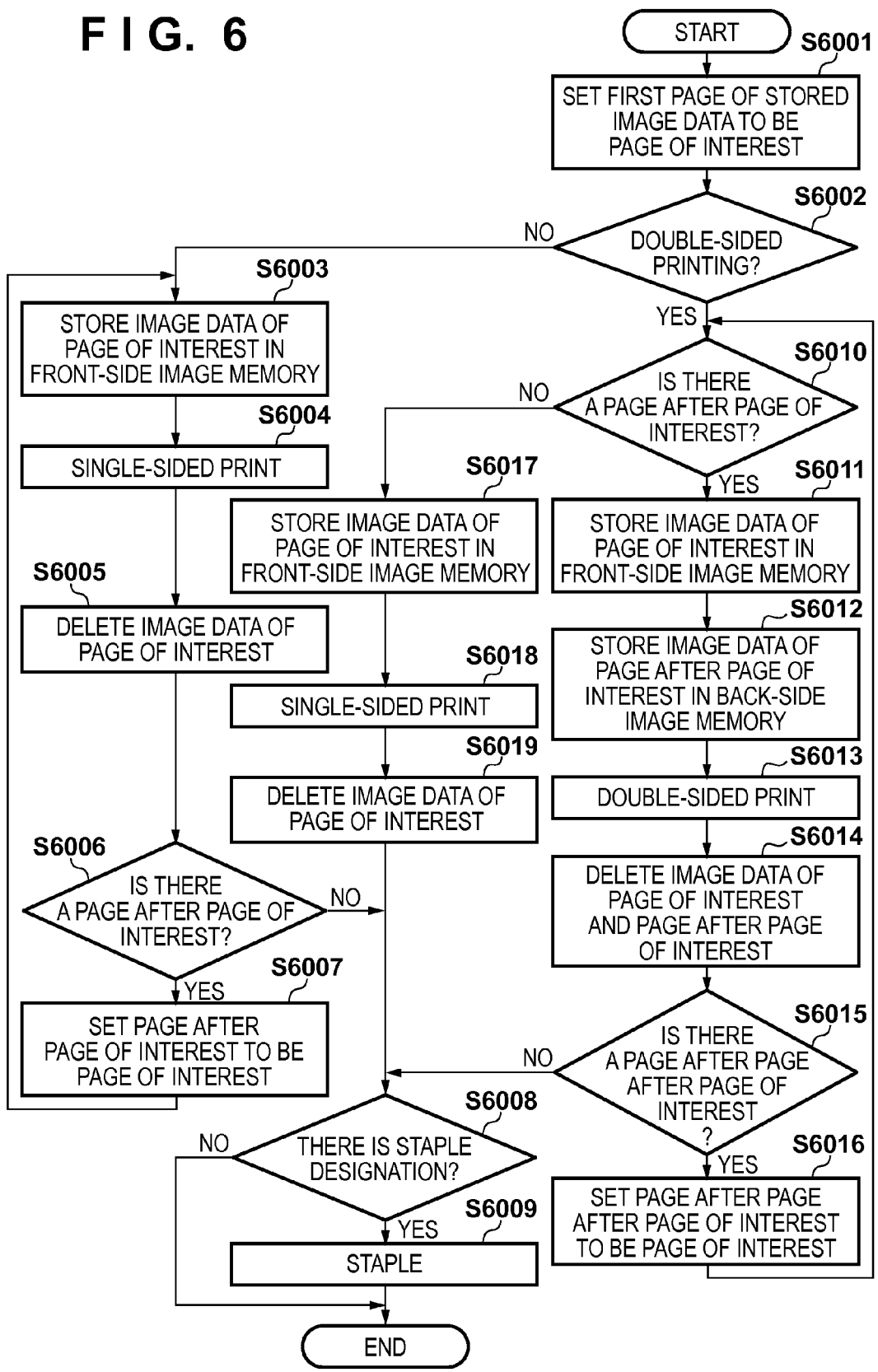
FIG. 6 is a flowchart for showing details of processing in step S5108.

Next, details of the processing in the above described step S5108 will be explained using the flowchart of FIG. 6. In step S6001, the CPU 301 sets an image of the first page out of the images of the pages saved in the HDD 305 as the image of the page of interest.

In step S6002, the CPU 301 determines whether or not the print setting according to the job setting instruction saved in the HDD 305 in step S5104 is for double-sided printing. If the result of this determination is that the setting is for double-sided printing, the processing proceeds to step S6010, and if the result of the determination is that the setting is for single-sided printing, the processing proceeds to step S6003. In step S6003, the CPU 301 controls the image processor 303 and reads the image of the page of interest from the HDD 305 into the front-side area of the image memory 304.

In step S6004, the CPU 301 controls the image processor 303 and transmits the image read into the front-side area in step S6003 to the printer unit 202 via the signal line 312, and transmits a job setting instruction to the printer unit 202. The printer unit 202 performs an image print of only the front-side of the sheet by transmitting only the image stored in the front-side area because the image stored in the front-side area is printed on the front-side of the sheet and the image stored in the back-side area is printed on the back-side of the sheet.

In step S6005, the CPU 301 deletes the image of the page of interest from the HDD 305. In step S6006, the CPU 301 determines whether or not the page of interest is the final page to be printed. This determination is performed by determining whether or not an image of a printing target page is still saved in the HDD 305. When the result of the determination is that the page of interest is the final page, the processing proceeds to step S6008, and when the page is not the final page, the processing proceeds to step S6007. In step S6007, the CPU 301 sets the page after the page of interest to be the new page of interest, and the processing returns to step S6003.

Meanwhile, in step S6008, the CPU 301 determines whether or not the setting according to the job setting instruction is "staple". If the result of this determination is that the setting is "staple", the processing proceeds to step S6009, and if the setting is not "staple", the processing completes.

In step S6009, the CPU 301 causes the printer unit 202 to discharge each sheet to the finisher unit 205 as a printed material, and causes the finisher unit 205 to perform the stapling processing on the sheets and to discharge the printed material.

Meanwhile, in step S6010, the CPU 301 determines whether or not the page of interest is the final page to be printed. The determination is performed by determining whether or not an image of a printing target page other than the page of interest is still saved in the HDD 305. When the result of the determination is that the page of interest is the final page, the processing proceeds to step S6017, and when the page is not the final page, the processing proceeds to step S6011. In step S6017, the CPU 301 controls the image processor 303 and reads the image of the page of interest from the HDD 305 into the front-side area of the image memory 304.

In step S6018, the CPU 301 controls the image processor 303 and transmits the image read into the front-side area in step S6017 to the printer unit 202 via the signal line 312, and transmits a job setting instruction to the printer unit 202. In step S6019, the CPU 301 deletes the image of the page of interest from the HDD 305.

Meanwhile, in step S6011, the CPU 301 controls the image processor 303 and reads the image of the page of interest from the HDD 305 into the front-side area of the image memory 304. In step S6012, the CPU 301 controls the image processor 303 and reads the image of the page after the page of interest from the HDD 305 into the back-side area of the image memory 304.

In step S6013, the CPU 301 controls the image processor 303 to transmit the image read into the front-side area in step S6011 and the image read into the back-side area in step S6012 to the printer unit 202 via the signal line 312. Also, the CPU 301 transmits the job setting instruction to the printer unit 202. The printer unit 202 prints the image stored in the front-side area to the front-side of the sheet and prints the image stored in the back-side area on the back-side of the sheet. For this reason, the printer unit 202 performs an image print to each of the front-side and the back-side of the sheet by transmitting the image stored in the front-side area and the image stored in the back-side area. In step S6014, the CPU 301 deletes from the HDD 305 the image of the page of interest and the image of the page after the page of interest.

Meanwhile, in step S6015, the CPU 301 determines whether or not the page after page of interest is the final page to be printed. The determination is performed by determining whether or not an image of the page after the page after the page of interest is still saved in the HDD 305. When the result of the determination is that the page of interest is the final page, the processing proceeds to step S6008, and when the page is not the final page, the processing proceeds to step S6016. In step S6016, the CPU 301 sets the page after the page after the page of interest to be the new page of interest, and the processing returns to step S6010.

Next, details of the processing in the above described step S5110 will be explained using the flowchart of FIG. 13. In step S13001, the CPU 301 sets an image of the first page out of the images of the pages saved in the HDD 305 as the image of the page of interest.

In step S13002, the CPU 301 determines whether or not the print setting according to the job setting instruction saved in the HDD 305 in step S5104 is for double-sided printing. If the result of this determination is that the setting is for double-sided printing, the processing proceeds to step S13008, and if the result of the determination is that the setting is for single-sided printing, the processing proceeds to step S13003.

In step S13003, the CPU 301 controls the image processor 303 and reads the image of the page of interest from the HDD 305 into the front-side area of the image memory 304. In step S13004, the CPU 301 controls the image processor 303 and transmits the image read into the front-side area in step S13003 to the printer unit 202 via the signal line 312, and transmits a job setting instruction to the printer unit 202. In step S13005, the CPU 301 deletes the image of the page of interest from the HDD 305.

In step S13006, the CPU 301 determines whether or not the page of interest is the final page to be printed. When the result of the determination is that the page of interest is the final page, the processing completes, and when the page is not the final page, the processing proceeds to step S13007. In step S13007, the CPU 301 sets the page after the page of interest to the new page of interest, and the processing returns to step S13003.

Meanwhile, in step S13008, the CPU 301 determines whether or not the page of interest is the final page to be printed. When the result of the determination is that the page of interest is the final page, the processing proceeds to step S13015, and when the page is not the final page, the processing proceeds to step S13009.

In step S13009, the CPU 301 controls the image processor 303 and reads the image of the page of interest from the HDD 305 into the front-side area of the image memory 304. In step S13010, the CPU 301 controls the image processor 303 and reads the image of the page after the page of interest from the HDD 305 into the back-side area of the image memory 304.

In step S13011, the CPU 301 controls the image processor 303 to transmit the image read into the front-side area in step S13009 and the image read into the back-side area in step S13010 to the printer unit 202 via the signal line 312. Also, the CPU 301 transmits the job setting instruction to the printer unit 202. In step S13012, the CPU 301 deletes from the HDD 305 the image of the page of interest and the image of the page after the page of interest.

In step S13013, the CPU 301 determines whether or not the page after page of interest is the final page to be printed. When the result of the determination is that the page of interest is the final page, the processing completes, and when the page is not the final page, the processing proceeds to step S13014. In step S13014, the CPU 301 sets the page after the page after the page of interest to be the new page of interest, and the processing returns to step S13008.

Meanwhile, in step S13015, the CPU 301 controls the image processor 303 and reads the image of the page of interest from the HDD 305 into the front-side area of the image memory 304. In step S13016, the CPU 301 changes the discharge destination that job setting instruction designates. For example, in a case where the discharge destination that the job setting instruction designates is the stack tray 802, the job setting instruction is updated by changing the discharge destination to the escape tray 801.

In step S13017, the CPU 301 controls the image processor 303 to transmit the image read into the front-side area in step S13016 to the printer unit 202 via the signal line 312. Also, the CPU 301 transmits the job setting instruction that is updated in step S13016 to the printer unit 202. With this, the printer unit 202 prints the image read into the front-side area in step S13016 in a single-sided print (printing to the front-side of the sheet), and after the printing, discharges the sheet to a discharge destination that is different to the discharge destination of the pages other than the final page.

In step S13018, the CPU 301 the discharge destination that the job setting instruction designates is returned to what it was prior to the change in step S13016. For example, in a case where the discharge destination that the job setting instruction designates prior to the change in step S13016 is the stack tray 802, the discharge destination that the job setting instruction designates after the change in step S13016 is changed to the stack tray 802. Thereby, the job setting instruction is updated.

In this way, when the page P that is printed last in the double-sided printing is an odd-numbered page counting from the first page in a print order (an odd page), the data of the page P is not deleted but stored. Meanwhile, if the data of one or more subsequent pages continuing from the page P is received, printing is performed by reading data of subsequent pages following the data of the page P. With this, the page P is printed to the front-side of the first sheet of the printing performed in accordance with receiving a job completion instruction, and the first page of the subsequent pages is printed on the back-side.

Also, the sheet of the page P printed in accordance with receiving the PRP instruction is discharged to a discharge destination that is different to that of the sheets up until that point (the sheets printed for each page from the first page up until the page immediately preceding the page P). Also, the discharge destination in the printing performed in accordance with receiving the job completion instruction is the same as that of the sheets up until that point (the sheets printed for each page from the first page up until the page immediately preceding the page P). For this reason, as a result, the sheets to which the page P is printed on the front-side and nothing is printed on the back-side, and the sheets on which the double-sided printing is performed for each page from the first page up until the termination page can be divided into different discharge destinations. So, the user can obtain a desired printed material (the sheets to which the double-sided printing is performed for each page from the first page up until the termination page) from one discharge destination.

Explanation will be given for sheets in each discharge destination using FIG. 12. In FIG. 12, the sheets in each discharge destination are indicated for a case where the sequence shown in FIG. 4 is executed.

When 4001-4007 shown in FIG. 4 are executed, the data of the images for the first page-the fifth page is saved in the print job storage area of the HDD 305 as is shown in the uppermost stage of FIG. 12.

Then, when 4008 of FIG. 4 is executed, the images of the first page-the fifth page are printed in double-sided printing as is shown in the second stage from the top in FIG. 12. A sheet to which the first page is printed on the front-side and the second page is printed on the back-side (P1/P2), and a sheet to which the third page is printed on the front-side and the fourth page is printed on the back-side (P3/P4) are discharged. Also, a sheet to which the fifth page is printed on the front-side and nothing is printed on the back-side (P5) is discharged. Here, the sheet P1/P2 and the sheet P3/P4 are discharged to the same discharge destination. On the other hand, the fifth page is an odd-numbered page counting from the first page (the first page) in the print order, and therefore it is discharged to a discharge destination that is different to that of the sheet P1/P2 and the sheet P3/P4. Furthermore, the data of the fifth page is not deleted but is stored in the print job storage area of the HDD 305.

When 4009-4013 of FIG. 4 are executed, the data of the images of the sixth page-the tenth page is saved in the print job storage area of the HDD 305 as is shown in the third stage from the top in FIG. 12. Here as described on the left, the data of the image of the fifth page is still stored in the print job storage area of the HDD 305. For this reason, as a result, the data the images of the fifth page-the tenth page is saved in the print job storage area of the HDD 305.

When 4014 of FIG. 4 is executed, double-sided printing is performed on the fifth page and the sixth page, double-sided printing is performed on the seventh page and the eighth page, and double-sided printing is performed on the ninth page and the tenth page as is shown in the bottommost stage of FIG. 12. For this reason, as a result, the sheet to which the fifth page is printed on the front-side and the sixth page is printed on the back-side (P5/P6), and the sheet to which the seventh page is printed on the front-side and the eighth page is printed on the back-side (P7/P8) are obtained. Also, the sheet to which the ninth page is printed on the front-side and the tenth page is printed on the back-side (P9/P10) is obtained. Furthermore, these sheets (P5/P6, P7/P8, P9/P10) are discharged from the same discharge destination as the previous sheets (P1/P2, P3/P4). For this reason, as a result, all of the sheets (P1/P2, P3/P4, P5/P6, P7/P8, P9/P10) are obtained from the same discharge destination. At this point in time, irrespective of the job setting instruction, the stapling processing is not performed; rather after the job completion instruction the stapling processing is performed on all of the sheets.

Second Embodiment

In the first embodiment, when the page P printed last in the double-sided printing according to the PRP instruction is an odd-numbered page counting from the first page in the print order, the discharge destination of the page P is changed to be a discharge destination that is different to the discharge destination of the pages printed up until that point. This is so that the page P will not be post-processed together with the other pages in a case where later continuing pages are input and post-processing such as stapling is performed. Accordingly, in a case where no designation for processing is made thereafter, there is not necessarily the necessity to make the discharge destination be separate. For example, configuration may also be taken such that a shift discharge is performed in which the discharge position is shifted on the same tray.

Figure 13:
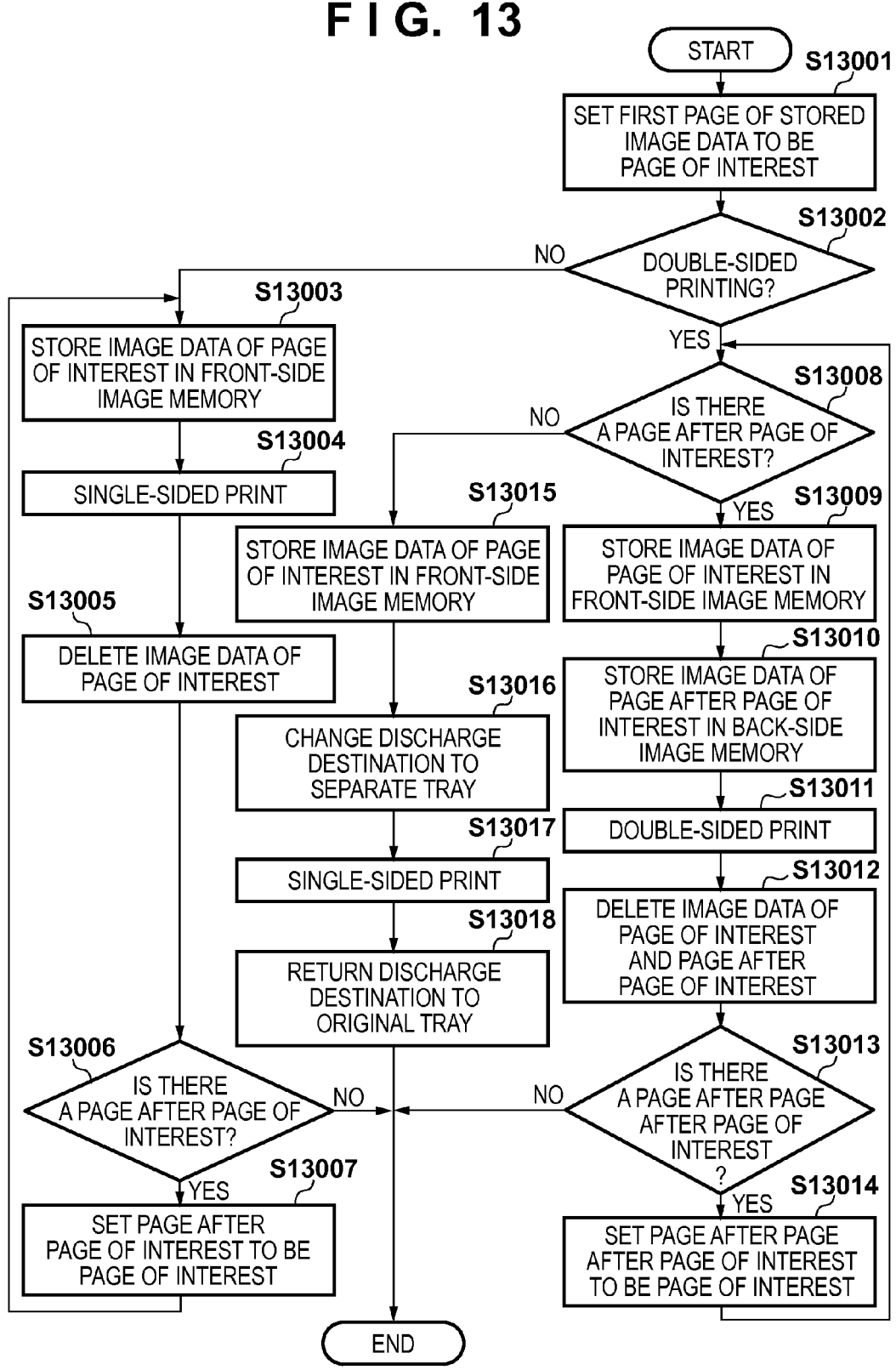
FIG. 13 is a flowchart for showing details of processing in step S5110.
Figure 14B:
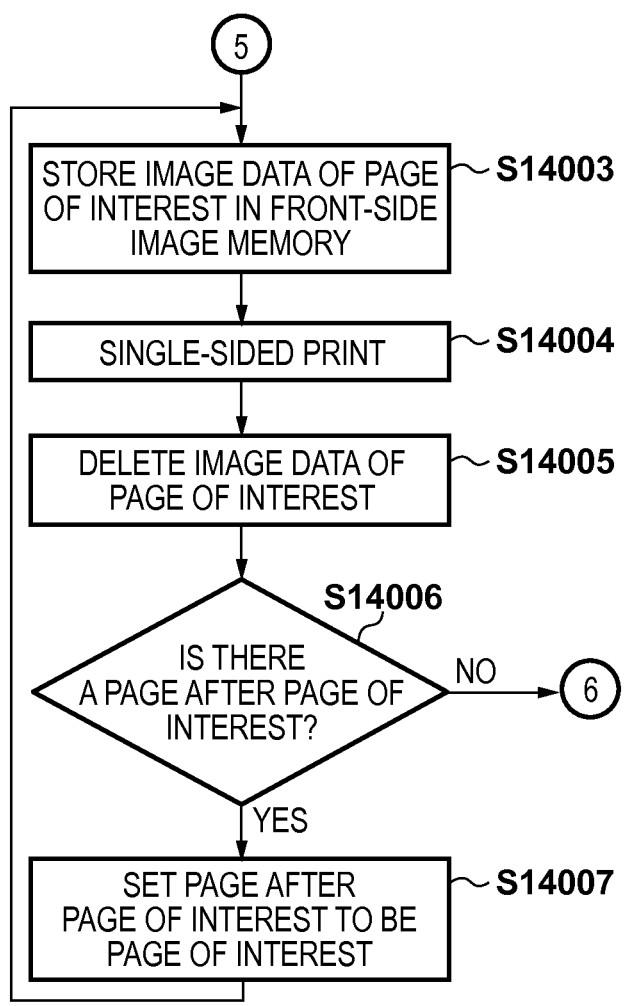

In such a case, in step S5110 described above, processing in accordance with the flowchart of each of FIGS. 14A and 14B is performed rather than the processing in accordance with the flowchart of FIG. 13. In the present embodiment, only the processing in step S5110 differs from the first embodiment in this way, and other than that, the processing is the same as in the first embodiment. However, it is assumed that the processing is the same as in the first embodiment unless specifically touched upon below. Of course, the present embodiment may be changed/transformed as appropriate if the same objective can be achieved.

In FIG. 14A, step S14001-step S14015 are the same as step S13001-step S13015 in FIG. 13 respectively. For this reason, the explanation corresponding to these processing steps is omitted, and below explanation will be given for the processing steps of step S14016-step S14022.

In step S14016, the CPU 301 determines whether or not the setting according to the job setting instruction is "staple". If the result of this determination is that the setting is "staple", the processing proceeds to step S14017, and if the setting is not "staple", the processing proceeds to step S14018.

In step S14017, the CPU 301 changes the discharge destination that job setting instruction designates. For example, in a case where the discharge destination that the job setting instruction designates is the stack tray 802, the job setting instruction is updated by changing the discharge destination to the escape tray 801.

Meanwhile, in step S14018, the CPU 301 sets the printer unit 202 so that a shift discharge is performed. In other words, instruction is made such that the page last printed in the double-sided printing by the PRP instruction (an odd-numbered page counting from the first page in the print order) is discharged in a state in which it is shifted from the pages printed up until that point, while being discharged to the same discharge destination.

In step S14019, the CPU 301 controls the image processor 303 to transmit the image read into the front-side area in step S14015 to the printer unit 202 via the signal line 312. Also, when the processing of step S14017 is performed, the job setting instruction updated in step S14017 is transmitted to the printer unit 202. With this, the printer unit 202 prints (prints to the front-side of the sheet) the image read in the front-side area in single-sided printing in step S14015. Then the printer unit 202, after the printing, discharges the sheet to a discharge destination that is different to the discharge destination of the pages other than the last page, or discharges to a position that is shifted from the already printed sheets in the same discharge destination as the discharge destination of the pages other than the last page.

In step S14020, the CPU 301 determines whether or not the setting according to the job setting instruction is "staple". If the result of this determination is that the setting is "staple", the processing proceeds to step S14021, and if the setting is not "staple", the processing proceeds to step S14022.

In step S14022, the CPU 301 deletes the setting for performing the shift discharge and sets the printer unit 202 so that in the printing thereafter the shift discharge is not performed.

In step S14021, the CPU 301 returns the discharge destination that the job setting instruction designates to what it was prior to the change in step S14017. For example, in a case where the discharge destination that the job setting instruction designates prior to the change in step S14017 is the stack tray 802, the discharge destination that the job setting instruction designates after the change in step S14017 is changed to the stack tray 802. Thereby, the job setting instruction is updated.

Third Embodiment

In the first and second embodiments, the following example was explained. That is, in a case where the page P, which is printed last in double-sided printing according to a PRP instruction, is an odd-numbered page counting from the first page in the print order, a single-sided print is performed on the page P. If, after this, subsequent pages are received, double-sided printing is performed for the page P with the first page in the subsequent pages. As a result, the page P is printed two times, and the page P is printed on two sheets. However, even if the page P is printed on two sheets, what the user actually desires is that it be printed on the sheet in the double-sided print with the first page of the subsequent pages, and not that the page P be printed on the sheet in the single-sided print.

So, in order that the user does not mistakenly take these two sheets, configuration may also be taken such that some kind of additional information is printed to the sheet on which the page P is printed in the single-sided print, so as to notify the user that this sheet is not the sheet that the user in the end desires.

For the printing of the additional information, a variety of things can be considered, and a print method such as a watermark print, a stamp print, or the like, may be used to print information such as an image or text. Also, the print position is not limited to a specific print position, and printing may be performed to a position in a corner of the sheet, or printing may be performed so as to overlap the area in which the image of the page is printed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076464, filed Apr. 2, 2014, which is hereby incorporated by reference herein in its entirety.

What is claimed is:

1. An image forming apparatus, comprising:
a printing unit configured to perform a double-sided print for a plurality of pages; and
a deletion unit configured to delete data of a page that the printing unit prints;
wherein the deletion unit, in a case where a page printed last by the printing unit out of the plurality of pages is an odd page counting from the first page in a print order, does not delete but stores data of the page printed last.

2. The image forming apparatus according to claim 1, wherein
the printing unit
discharges a sheet of the odd page printed last by the printing unit to a discharge destination that is different to a discharge destination of a sheet of a page out of the plurality of pages other than the odd page printed last by the printing unit.

3. The image forming apparatus according to claim 1, wherein
the printing unit
discharges a sheet of the odd page printed last by the printing unit to a same discharge destination as a sheet of a page out of the plurality of pages other than the odd page printed last by the printing unit, and shifted from the sheet of the page out of the plurality of pages other than the odd page printed last by the printing unit.

4. The image forming apparatus according to claim 1, wherein
the printing unit
prints additional information on a sheet of the odd page printed last by the printing unit.

5. The image forming apparatus according to claim 1, wherein
the printing unit
sequentially performs a double-sided print of the odd page printed last by the printing unit and a subsequent page, which continues from the plurality of pages, by causing data of the subsequent page to follow the data stored by the deletion unit when the data of the subsequent page is received.

6. The image forming apparatus according to claim 5, wherein the printing unit
discharges a sheet of a page in the plurality of pages other than the odd page printed last by the printing unit and a sheet to which the double-sided print is sequentially performed on the odd page printed last by the printing unit and the subsequent page to the same discharge destination.

7. The image forming apparatus according to claim 5, wherein the plurality of pages are pages received before receiving an instruction to print, and the subsequent page is a page received after receiving the instruction.

8. An image forming method that an image forming apparatus comprising a printing unit for performing a double-sided print for a plurality of pages performs, the method comprising:
   a deletion step of deleting data of a page that the printing unit prints,
   wherein, in the deletion step, in a case where a page printed last by the printing unit out of the plurality of pages is an odd page counting from the first page in a print order, data of the page printed last is not deleted but stored.

\* \* \* \* \*